2 Sheets—Sheet 1.
J. SHAW.
Assignor to the HILLS ARCHIMEDIAN LAWN MOWER CO.
Lawn-Mower.
No. 8,268. Reissued May 28, 1878.
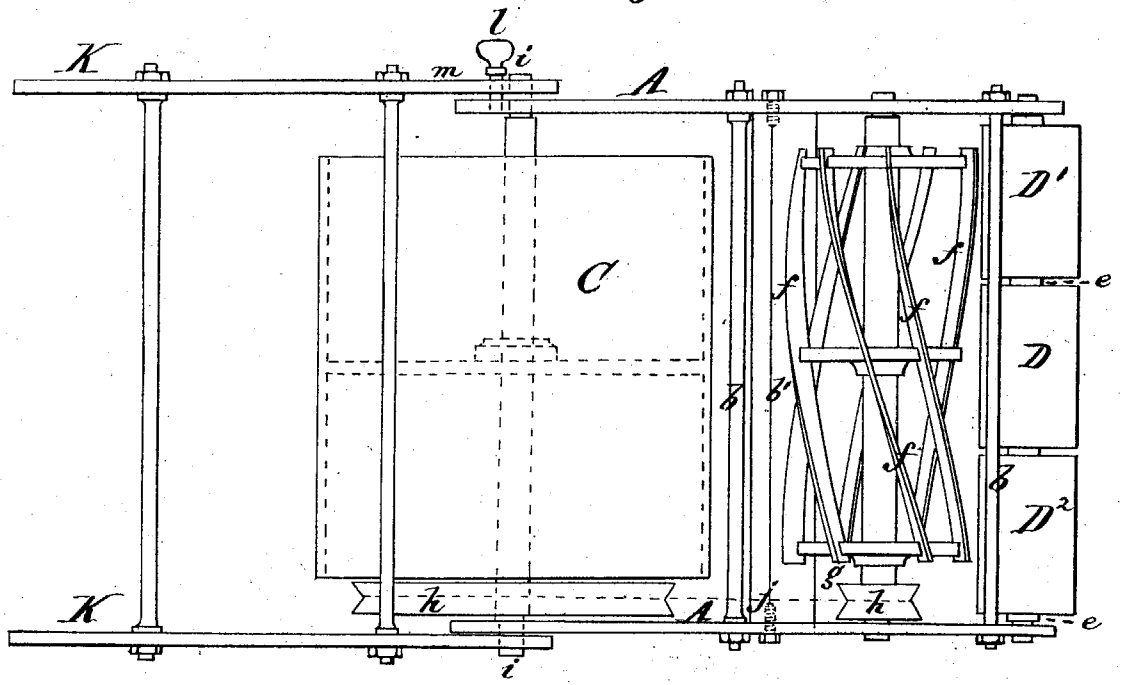
Witnesses
Hugh Jones.
William Millard
Inventor
John Shaw
by his atty.
L. D. Law
THE NORRIS PETERS CO., PHOTO-LITHO., WASHINGTON, D. C.

2 Sheets—Sheet 2.
J. SHAW.
Assignor to the HILLS ARCHIMEDIAN LAWN MOWER CO.
Lawn-Mower.
No. 8,268. Reissued May 28, 1878.
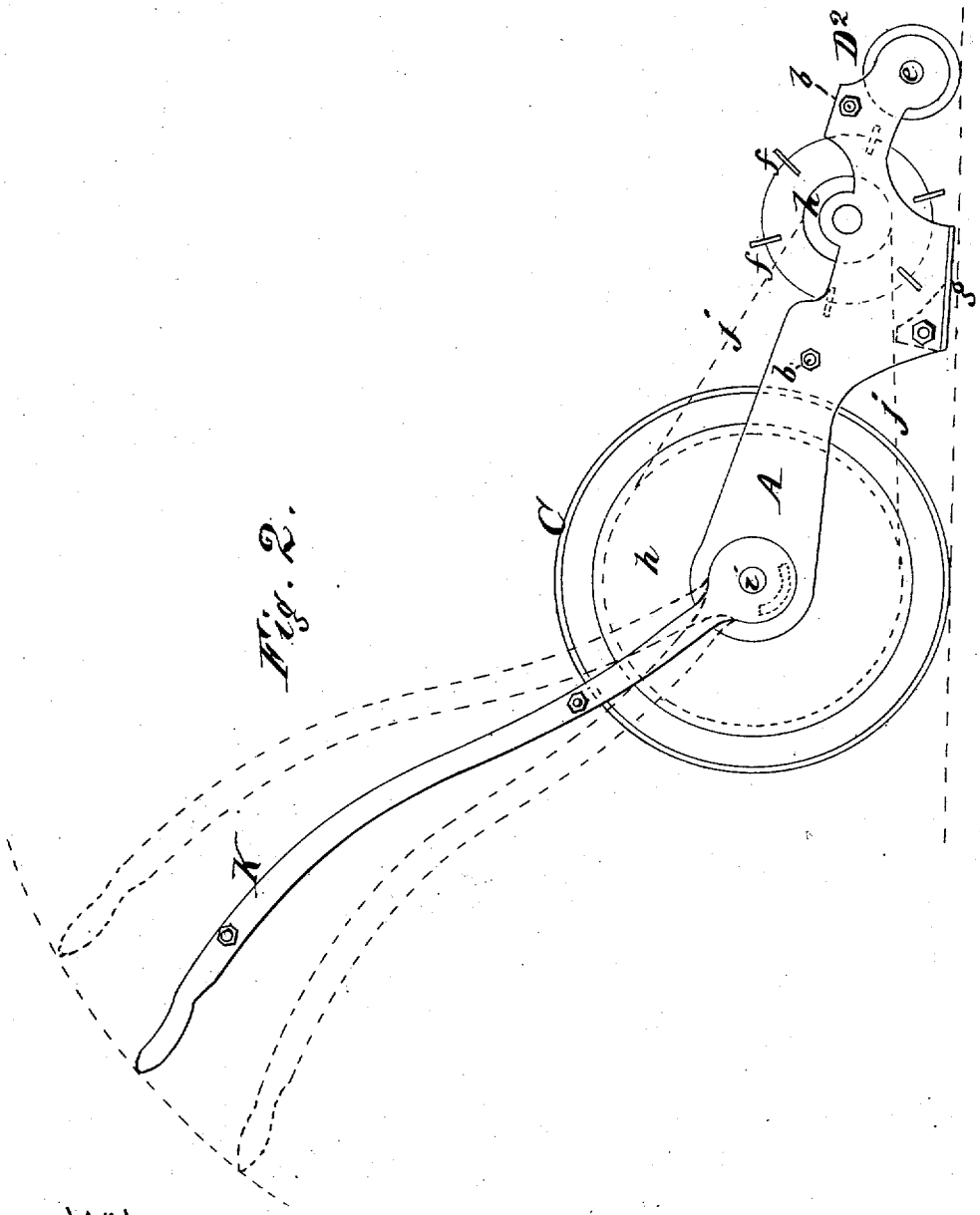
Witnesses
Hugh Jones
William Millard
Inventor
John Shaw
by his atty.
L. D. Law
THE NORRIS PETERS CO., PHOTO-LITHO., WASHINGTON, D. C.

UNITED STATES PATENT OFFICE.

JOHN SHAW, OF BROOKLYN, NEW YORK, ASSIGNOR TO THE HILLS ARCHIMEDIAN LAWN MOWER COMPANY, OF HARTFORD, CONNECTICUT.

IMPROVEMENT IN LAWN-MOWERS.

Specification forming part of Letters Patent No. 83,101, dated October 13, 1868; Reissue No. 8,268, dated May 28, 1878; application filed May 26, 1875; patented in England, January 23, 1864.

*To all whom it may concern:*

Be it known that I, JOHN SHAW, of Brooklyn, in the county of Kings and State of New York, formerly of Leeds, England, have made an invention of certain new and useful Improvements in Lawn-Mowing Machines, for which I obtained a patent in England, dated January 23, 1864; and I do hereby declare that the following is a full, clear, and exact description of the construction and operation of the same.

My invention appertains to that species of machines commonly called "lawn-mowers," in which the cutting apparatus consists of a series of two or more revolving helical cutters arranged above and acting in combination with a fixed cutting-blade, so as to produce a shearing cut; and my invention consists of certain combinations of mechanical devices, which are specified in detail at the close of this specification.

In order that the invention may be understood, I have represented in the accompanying drawings, and will proceed to describe, a lawn-mower embodying my invention in the best form known to me at the date of the application for my original patent.

Figure 1 represents a plan of the said machine, and Fig. 2 represents a side view of it.

The frame of the said machine consists of two side pieces, A A, connected by cross-bars *b b b'*. This frame has a rear ground-support and a front ground-support, with the cutting apparatus arranged between the two. The rear ground-support is formed by the roller C, which also operates as the driver, by which motion is imparted to the series of revolving helical cutters. The front-support is composed of three sections of a roller, D $D^1$ $D^2$, each of which can turn upon the shaft *e*, so that either side roller-section $D^1$ or $D^2$ can turn independently of the other when the machine is turned upon the ground.

The cutting apparatus is composed of the series of revolving helical cutters *f* and of the fixed blade *g*, above which the helical cutters are arranged to revolve.

The shaft of the helical cutters is connected with the rear rolling support C by means of pulleys *h h* and a chain, represented by the dotted line *j*, so that the series of helical cutters is caused to revolve over the edge of the fixed blade *g*.

The fixed cutting-blade is composed of a continuous bar placed horizontally under the revolving helical cutter, and is constructed with a continuous straight cutting-edge as distinguished from a cutter-bar or cutting-surfaces fixed in position, but broken, or in separate pieces, as in a machine patented July 7, 1857, to Manny, and in others.

The machine is propelled or moved forward by means of the handles K, and instead of combining these handles rigidly with the frame of the machine, as has hitherto been the practice in this class of machines, they are combined with it through the intervention of a hinge-pivot formed by the shaft *i*. Hence the body of the machine, with its cutting apparatus and ground-supports, is, by such connection with the handles, made a vibrating or swinging frame—that is, can have motion irrespective of and not controlled by the handles, and can adapt itself to the undulating surface of the ground independently of the operator who propels it, and requiring no judgment or attention on his part to raise or lower the cutter to suit unevenness of the surface; and, in addition, the handles are self-adjusting to the heights of different operators.

In order that the handles may be rigidly held at any adjustment relatively to the body of the machine, if desired, or when it is to be moved without cutting, a thumb-nut, *l*, is provided, which passes through a curved slot made in one of the shanks *m* of the handles, and screws into one of the sides A of the frame, clamping the handles and frame together.

I am aware that previous to my invention lawn-mowers have been constructed with two rolling supports, both in the rear of the cutting apparatus, which was thus overhung in advance of its ground-supports; but when in such cases the first roller passed over a protuberance, the cutting apparatus, being overhung in advance of such support, was raised about double the height of the protuberance by the oscillation of the frame upon the axis of the rear roller-support. On the other hand, when the rear roller passed over the protuberance, the cutting apparatus was depressed about as much as the height of the protuberance, and was sometimes caused to dig into the ground by the oscillation of the frame on the axis of the front roller-support. The result was great irregularity in the cutting of grass on undulating ground. Now, by my new arrangement of the cutting apparatus between the ground-supports, the cutting apparatus is caused to rise only about half the height of the protuberance, over which either the front ground-support or the rear one passes, and the tendency of a protuberance to depress the cutting apparatus, or to cause it to dig into the ground, is entirely prevented. Moreover, as by my additional improvement in reference to the handles the body of the machine can move in vertical directions independently of the handles and the person operating them, the machine adjusts itself to undulations of the surface.

I do not claim any one of the members of my machine separately.

I claim as my invention in lawn-mowers—

1. The combination of the cutting apparatus, consisting of the revolving helical cutters and the fixed cutting-blade, with a swinging or vibrating frame, substantially as described, whereby the cutting apparatus can adapt itself to follow the undulations of the ground, irrespective of the operator.

2. The combination, with the swinging or vibrating cutter-frame, having a cutting apparatus consisting of revolving helical cutters and a fixed cutting-blade, of the handles K and clamping devices, whereby the entire frame of the machine may be made rigid at will, substantially as described.

3. In combination with a swinging or vibrating frame having a cutting apparatus consisting of revolving helical cutters and a fixed cutting-blade, the handles K, arranged for pushing the machine, hinged or journaled to the swinging frame A of the machine, so as to swing up and down, substantially as described.

4. In combination with a swinging or vibrating frame, A, having a cutting apparatus, consisting of revolving helical cutters and a fixed cutting-blade, the handles K, hinged or journaled to the swinging frame A, and adapted to be swung to the front or rear, substantially as described.

5. In combination with the swinging or vibrating frame A, having a cutting apparatus consisting of revolving helical cutters and a fixed cutting-blade, the hinged or pivoted handles K, and devices for adjusting and holding them in fixed position relatively to the frame A of the machine, substantially as described.

6. In combination with the frame A and handle K, with segmented slot in its shank, the thumb-nut *l*, for champing the two in fixed position, substantially as described.

7. The combination, with the swinging or vibrating cutter-frame having a cutting apparatus consisting of revolving helical cutters and a fixed cutting-blade, of the independent front rolling-supports in advance of the fixed blade of the cutting apparatus.

JOHN SHAW.

Witnesses:

FREDERICK DAUBER,

A. T. GUELITZ.